US012220292B2

(12) United States Patent
Khan

(10) Patent No.: US 12,220,292 B2
(45) Date of Patent: Feb. 11, 2025

(54) POWERED TOOTHBRUSH WITH COMPLEX MOVEMENT

(71) Applicant: Macksoud Khan, Palo Alto, CA (US)

(72) Inventor: Macksoud Khan, Palo Alto, CA (US)

( * ) Notice: Subject to any disclaimer, the term of this patent is extended or adjusted under 35 U.S.C. 154(b) by 678 days.

(21) Appl. No.: 17/522,886

(22) Filed: Nov. 9, 2021

(65) Prior Publication Data
US 2022/0175505 A1 Jun. 9, 2022

Related U.S. Application Data

(60) Provisional application No. 63/121,191, filed on Dec. 3, 2020.

(51) Int. Cl.
A61C 17/40 (2006.01)
A61C 17/34 (2006.01)

(52) U.S. Cl.
CPC ...... *A61C 17/3472* (2013.01); *A61C 17/3445* (2013.01); *A61C 17/40* (2013.01)

(58) Field of Classification Search
CPC . A61C 17/3472; A61C 17/40; A61C 17/3436; A61C 17/26; A61C 17/22; A61C 17/24; A46B 13/02; B24B 23/03; B26B 19/145; B26B 19/14; B26B 19/26; A61H 7/004; A61H 7/005; A61H 23/0254; F16H 1/32; F16H 49/001; F16H 55/08
USPC .......................................................... 15/28
See application file for complete search history.

(56) References Cited

U.S. PATENT DOCUMENTS

| 1,483,606 | A | * | 2/1924 | Krohn | F16H 48/10 475/174 |
| 1,981,688 | A | * | 11/1934 | Conti | A61C 17/26 15/28 |
| 2,960,884 | A | * | 11/1960 | Hill | F16H 55/08 74/462 |
| 4,010,716 | A | * | 3/1977 | Minka | F02B 53/04 418/121 |
| 4,335,480 | A | | 6/1982 | Liu | |
| 4,603,448 | A | | 8/1986 | Middleton et al. | |
| 4,827,552 | A | | 5/1989 | Bojar et al. | |
| 5,070,567 | A | * | 12/1991 | Holland | A46B 7/08 15/28 |
| 5,142,724 | A | | 9/1992 | Park | |
| 5,177,826 | A | | 1/1993 | Vrignaud et al. | |
| 5,500,972 | A | * | 3/1996 | Foster | A47K 7/04 15/28 |
| 5,577,285 | A | | 11/1996 | Drossler | |
| 5,687,442 | A | * | 11/1997 | McLain | A46B 3/06 15/97.1 |
| 5,862,558 | A | | 1/1999 | Hilfinger et al. | |

(Continued)

Primary Examiner — Edward F Landrum
Assistant Examiner — Savino Rojas, Jr.

(57) ABSTRACT

Embodiments of the present invention comprise a powered toothbrush comprising a bristle head, an outer gear, and a plurality of bristles. Both the bristle head and the outer gear may comprise a distal end, a proximal end, and a center. The distal end of the bristle head may mate with the proximal end of the outer gear. The outer gear may rotate about a first axis of rotation. The mating between the bristle head and the outer gear may cause the bristle head to orbit the first axis of rotation via one or more bristle paths while simultaneously completing one or more rotary movements about a second axis of rotation, which may move along the bristle paths with the bristle head.

6 Claims, 4 Drawing Sheets

(56) References Cited

U.S. PATENT DOCUMENTS

| | | | |
|---|---|---|---|
| 5,867,856 | A | 2/1999 | Herzog |
| 5,974,615 | A | 11/1999 | Schwarz-Hartmann et al. |
| 6,584,691 | B1* | 7/2003 | Gerasimov ............. B26B 19/14 |
| | | | 30/346.51 |
| 6,795,993 | B2 | 9/2004 | Lin |
| 6,813,793 | B2 | 11/2004 | Eliav |
| 6,983,729 | B2* | 1/2006 | Schapiro ................ F01C 17/00 |
| | | | 418/61.3 |
| 9,138,303 | B2 | 9/2015 | Park et al. |
| 2004/0231078 | A1 | 11/2004 | Braun |
| 2005/0188483 | A1* | 9/2005 | Scherl .................... A61C 17/26 |
| | | | 15/28 |
| 2011/0067194 | A1* | 3/2011 | Al-Qaffas .............. A46B 9/045 |
| | | | 15/167.2 |
| 2011/0138563 | A1* | 6/2011 | Phgura ................... A46B 9/04 |
| | | | 15/167.1 |
| 2014/0143962 | A1* | 5/2014 | Mok ...................... A61C 17/34 |
| | | | 15/22.1 |
| 2016/0287035 | A1* | 10/2016 | Woodard .............. A46B 13/06 |
| 2019/0321151 | A1* | 10/2019 | Rader .................. A61C 17/005 |

* cited by examiner ns of each of the plurality of bristles may be connected to
POWERED TOOTHBRUSH WITH COMPLEX MOVEMENT This application claims priority of U.S. Provisional Patent Application No. 63/121,191 filed on Dec. 3, 2020, and which is incorporated by reference herein.

BACKGROUND OF INVENTION

The present invention relates to powered toothbrushes, specifically those powered by electricity. Most powered toothbrushes that exist in the art comprise bristles that are used to clean a user's teeth, said bristles being connected to the toothbrush by a bristle head. In the art, a functionality of powered toothbrushes may be that the bristle head moves automatically. The motion of the bristle head is generally an oscillatory motion either along the distal-proximal axis of the toothbrush or about an axis of rotation of the bristle head. Bristle heads that move in an oscillatory manner about their axes of rotation may not be effective in cleaning teeth.

Some toothbrushes exist in which the bristle head moves in a rotary manner about its axis of rotation, the term rotary herein meaning moving in a complete circle unidirectionally (i.e. either clockwise or counterclockwise) about an axis of rotation. However, a simple rotary motion may cause damage to a user's gums because of the greater velocity of the bristles that are placed at a greater radial distance from the center of the bristle head. This has been discovered in the use of rotary sanders, wherein operating a rotary sander in one position may cause damage to the sanded surface that is contacted by the outermost portion of the sander.

In the field of rotary sanders, it has been discovered that slight translations of the sander while in operation reduces the damage to the sanded surface. By moving in this manner, the difference in velocities of the outermost area of the sanders and the innermost area if the sanders is less than if the sanders were to only rotate and not translate. This difference in velocity is decreased in order to normalize the force applied to the sanded surface, and therefore reduce damage to the sanded surface. The same principle of translation along with rotation is used in the present invention to prevent damage to a user's teeth and/or gums while using a powered toothbrush.

Furthermore, the translations as described herein when applied to the bristle head of a powered toothbrush are more effective at cleaning a user's teeth, since the translations of the bristle head allow the bristles to reach more areas of a user's teeth and gums when the toothbrush is held in one position than if the bristle head did not oscillate. The translations of the bristle head also allow the bristles to contact a user's teeth and gums at different angles than if the bristle head did not translate, which allows for cleaning of areas of the user's teeth and gums that may be hard to reach with a simple oscillating toothbrush.

Therefore, there exists a need in the art for a toothbrush that comprises a bristle head that not only moves in a rotary manner, but may also translate as to reduce the damage to a patient's teeth and/or gums.

SUMMARY OF INVENTION

Embodiments of the present invention may comprise a powered toothbrush, which may comprise a bristle head and an outer gear. Both the bristle head and the outer gear may comprise a distal end, a proximal end, and a center. The powered toothbrush may further comprise a plurality of bristles, each with a distal end and a proximal end. The distal ends of each of the plurality of bristles may be connected to the proximal end of the bristle head. The distal end of the bristle head may mate with the proximal end of the outer gear.

The outer gear may rotate about a first axis of rotation. Said first axis of rotation may run from the distal end of the outer gear to the proximal end of the outer gear through the center of the outer gear. The mating between the bristle head and the outer gear may cause the bristle head to orbit the first axis of rotation via one or more bristle paths while simultaneously completing one or more rotary movements about a second axis of rotation. The second axis of rotation may run from the distal end of the bristle head to the proximal end of the bristle head through the center of the bristle head. The second axis of rotation may move along the one or more bristle paths with the bristle head.

In some embodiments, the one or more bristle paths may be oval-shaped. In other embodiments, the one or more bristle paths may be circular-shaped. In some embodiments, the one or more bristle paths may be located on a translation plane. The translation plane may be normal to the first axis of rotation.

In some embodiments, the one or more rotary movements may comprise at least one full rotation about the second axis of rotation. In those and other embodiments, the one or more rotary movements may comprise at least one partial rotation about the second axis of rotation. The orbiting of the bristle head about the first axis of rotation may comprise one or more 360-degree orbits. In the embodiments of the invention in which the one or more rotary movements comprise at least one full rotation about the second axis of rotation, the bristle path may orbit anywhere in the range of 30 degrees to 360 degrees about the first axis of rotation in order to complete one full rotation about the second axis of rotation.

The powered toothbrush may further comprise a driveshaft with a distal end and a proximal end. The outer gear may comprise a first bevel gear, and the distal end of the driveshaft may comprise a second bevel gear that mates with the first bevel gear. In some embodiments, the first bevel gear may be located at the distal end of the outer gear. In other embodiments, the outer gear may be located anywhere along a length of the outer gear, said length spanning from the distal end of the outer gear to the proximal end of the outer gear.

The driveshaft may rotate about a third axis of rotation such that the mating between the first and second bevel gears causes the rotation of the outer gear about the first axis of rotation. In some embodiments, the third axis of rotation may be perpendicular to the first axis of rotation.

In some embodiments, the mating between the outer gear and bristle head may be such that the distal end of the bristle head comprises a plurality of rounded gear teeth, and the proximal end of the outer gear comprises a plurality of rounded gear teeth. When the outer gear rotates about the first axis of rotation, the rounded gear teeth of the outer gear may interact with the rounded gear teeth of the bristle head to cause the bristle head to orbit the first axis of rotation via the one or more bristle paths while simultaneously completing the one or more rotary movements about the second axis of rotation.

In other embodiments, the mating between the outer gear and bristle head may be such that the bristle head may mate with the proximal end of the outer gear such that the center of the bristle head is located an offset distance from the center of the outer gear. This mating between the bristle head and outer gear may allow the bristle head to rotate freely about the second axis of rotation. In these embodiments, the mating between the outer gear and bristle head may cause the bristle head to orbit the first axis of rotation while simultaneously completing the one or more rotary movements about the second axis of rotation when the outer gear rotates about the first axis of rotation.

In some of the embodiments wherein the bristle head mates with the outer gear such that the center of the bristle head is located an offset distance from the center of the outer gear, the mating between the outer gear and bristle head may be such that the bristle head comprises a hole that runs from the distal end of the bristle head to the proximal end of the bristle head through the center of the bristle head, and the outer gear comprises a post that extends proximally from the proximal end of the outer gear. The post may be located an offset distance from the center of the outer gear. The hole of the bristle head may mate with the post of the outer gear such that the rotation of the outer gear about the first axis of rotation causes the bristle head to orbit the first axis of rotation via the one or more bristle paths while simultaneously completing the one or more rotary movements about the second axis of rotation.

DETAILED DESCRIPTION

The description provided herein describes example embodiments of the invention and is not intended to limit the invention to any particular embodiments or features. Likewise, the figures provided herein are for example purposes, and are not intended to limit the invention to any particular features, size, shape, color, or any other functional or aesthetic property.

This invention uses the terms "proximal" and "distal". For the purposes of this description, a "proximal" portion of the invention is closer to a user's teeth when the invention is in use, and a "distal" portion of the invention is further from the user's teeth when the invention is in use. A first component being proximal to a second components means that the first component is closer to the user's teeth when the invention is in use. A first component being distal to a second component means that the first component is further from the user's teeth when the invention is in use. A component "extending distally" is extending away from a user's teeth, and a component "extending proximally" is extending towards a user's teeth.

Figure 1:
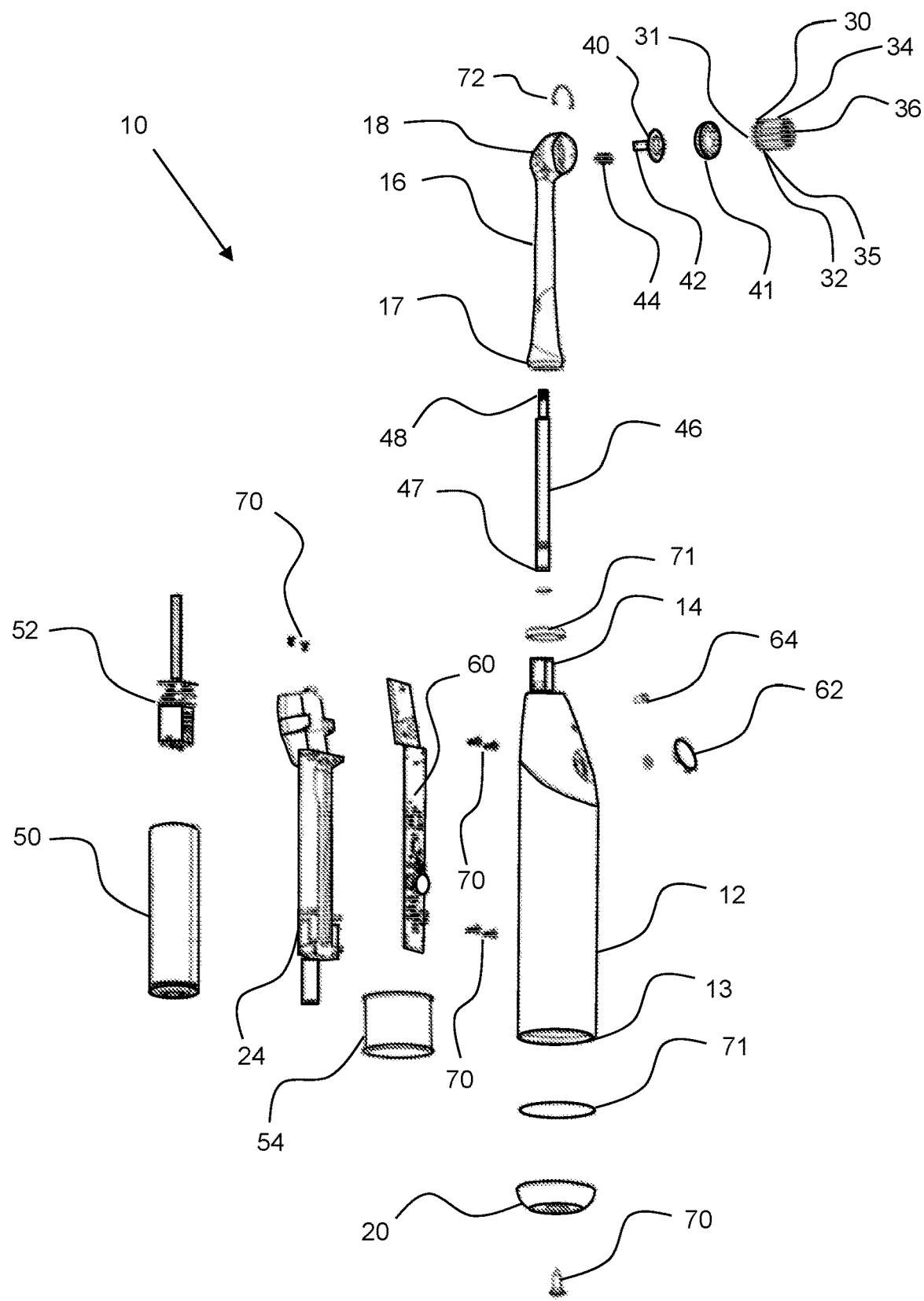
FIG. 1 is a perspective exploded view of a powered toothbrush.

FIG. 1 shows a perspective exploded view of a powered toothbrush 10 comprising a casing 12 with distal end 13 and a proximal end 14. The powered toothbrush 10 further comprises a head 16 with a distal end 17 and proximal end 18. The distal end 17 of the head 16 connects to the proximal end 14 of the casing 12. A driveshaft 46 comprising a distal end 47 and proximal end 48 is housed within the head 16 such that the distal end 47 of the driveshaft 46 is located near the distal end 17 of the head 16, and such that the proximal end 48 of the driveshaft 46 is located near the proximal end 18 of the head 16.

The distal end 47 of the driveshaft 46 is connected to a motor 52, which is housed within the casing 12. The motor 52 is powered by a battery 50, which is also housed within the casing 12. The proximal end 48 of the driveshaft 46 is connected to a second bevel gear 44, which mates with a first bevel gear 42. The mating between the first bevel gear 42 and second bevel gear 44 may be in the manner in which bevel gears mate as known in the art of bevel gears. The first bevel gear 42 is attached to an outer gear 40. The first bevel gear 42 and outer gear 40 are shown as the same piece in FIG. 1, such that the outer gear 40 comprises the first bevel gear 42 as the distal end of the outer gear 40.

The outer gear comprises a plurality of rounded gear teeth 41 at the proximal end of the outer gear 40. The rounded gear teeth 41 are shown as a separate piece from the outer gear 40 in FIG. 1. In these embodiments, the piece that comprises the rounded gear teeth 41 may be attached to the outer gear 40 during assembly. In other embodiments, the rounded gear teeth 41 and outer gear 40 are part of the same piece, which may also be the same piece as the first bevel gear 42.

The rounded gear teeth 41 mate with a distal end 31 of a bristle head 30. The distal end 31 of the bristle head 30 may comprise rounded gear teeth similar to the rounded gear teeth 41 of the outer gear, such that rotation of the rounded gear teeth 41 of the outer gear causes rotation of the bristle head 30. The bristle head further comprises a proximal end 32, on which a plurality of bristles 34 are attached. The bristles each comprise a distal end 35 that is attached to the proximal end 32 of the bristle head, and a proximal end 36 that contacts a user's teeth when the user uses the powered toothbrush 10 to brush their teeth.

The distal end 13 of the casing 12 is connected to a lid 20 which serves as a cover for the distal end 13 of the casing 12. The connection between the casing 12 and lid 20 is sealed with an o-ring 71, which is enclosed within the casing-lid connection when the powered toothbrush 10 is assembled. The powered toothbrush 10 also comprises another o-ring 71 that seals the connection between the casing 12 and the head 16. The invention may comprise any number of other o-rings not shown in FIG. 1.

The lid 20 may rest on or inside of a charger (not shown in FIG. 1) when the powered toothbrush 10 is charging. The charger may induce a magnetic field, which in turn induces an electrical current through an RX coil 54 located within the casing 12. The RX coil 54 may be connected to the battery 50 directly or via a circuit board 60. Thus, the charger may charge the battery 50 by means of induction, using the RX coil 54 to induce an electrical current.

Also shown in FIG. 1 are a plurality of screws 70 used to secure various components of the powered toothbrush 10 together. One of said screws 70 is located near the distal end 13 of the casing 12 and is used to secure the lid 20 to the casing 12. A retaining ring 72 is used to secure the bristle head 30 to the head 16.

Also shown in FIG. 1 is an inner frame 24 used to support other components of the powered toothbrush 10 within the casing 12. The inner frame 24 may serve as the structural component to support the circuit board 60. The circuit board 60 comprises an LED 64 that either protrudes through the casing 12 or shines light through the casing 12 by use of a lens or hole. The LED may be used to indicate various statuses of the powered toothbrush 10 such as charging, low battery, in-use, etc. A button 62 is connected to the circuit board and protrudes through the casing 12 in order to be able to be pressed by a user. By pressing the button, the user may switch the motor 52 and/or other components of the powered toothbrush 10 on and off by means of actuating a switch on the circuit board 60.

Figure 2:
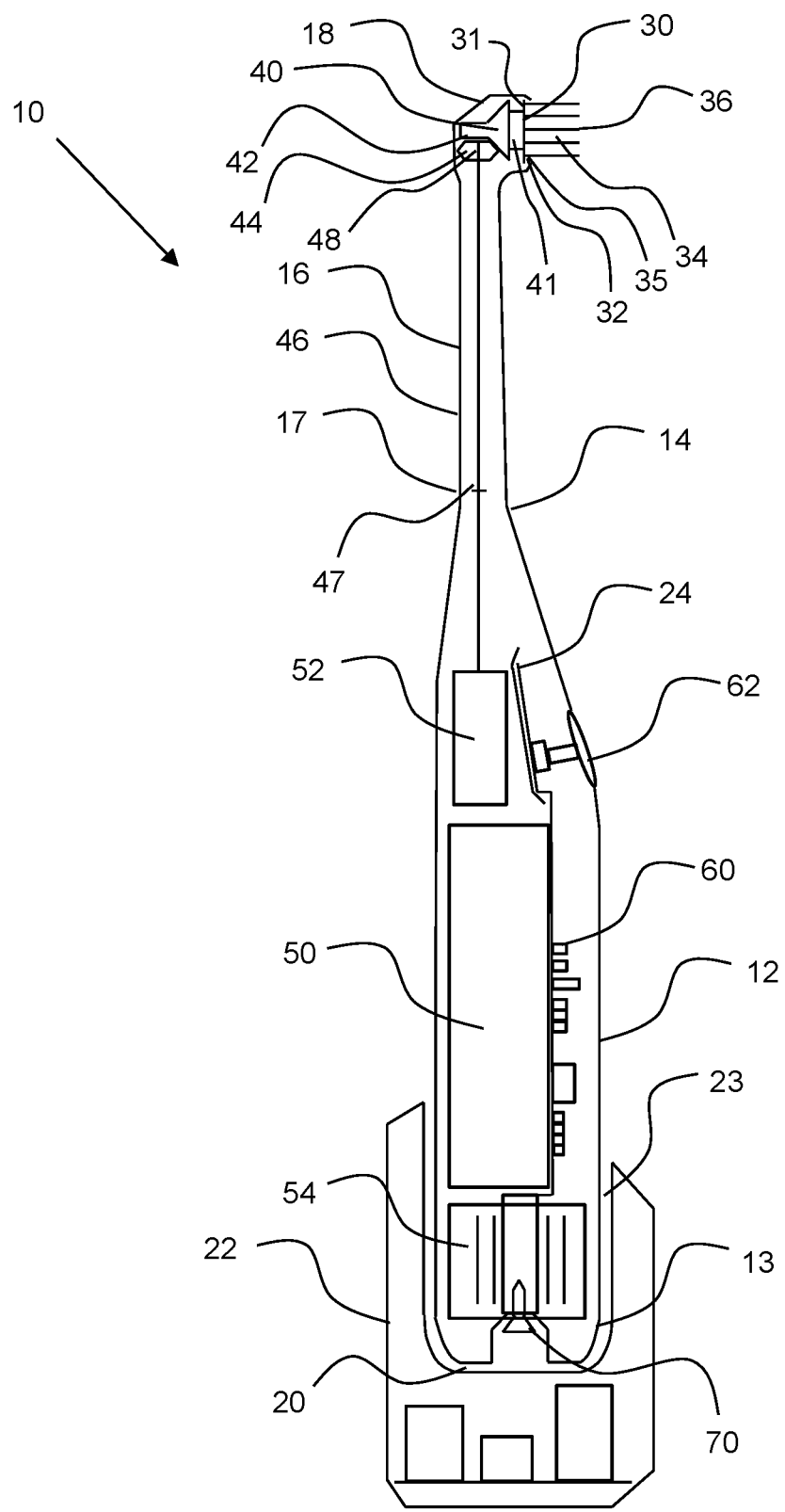
FIG. 2 is a right-side cross-sectional view of a powered toothbrush on a charger.

FIG. 2 shows a right-side cross-sectional view of the powered toothbrush 10 from FIG. 1. The casing 12 with its distal end 13 and proximal end 14 are shown in FIG. 2. Also shown in FIG. 2 are the head 16 with its distal end 17 and proximal end 18, the lid 20, the inner frame 24, the battery 50, the motor 52, the RX coil 54, the circuit board 60, the button 62, and one of the plurality of screws 70. Also shown in FIG. 2 is the bristle head 30 with its distal end 31 and proximal end 32, the bristles 34 with their distal ends 35 and proximal ends 36, the outer gear 40 with its rounded gear teeth 41 and first bevel gear 42, the second bevel gear 44, and the driveshaft 46 with its distal end 47 and proximal end 48. The connections between said components are the same in FIG. 2 as described in FIG. 1.

Also shown in FIG. 2 is the charger 22, on or in which the powered toothbrush 10 sits when it is charging. The charger comprises a receiving port 23 that exists as a recessed portion in which the distal end 13 of the casing 12 is placed when the powered toothbrush 10 is assembled. Placing the distal end 13 of the casing 12 inside of the receiving port 23 when the powered toothbrush 10 is assembled may cause the battery 50 to charge via induction as described previously herein. The charger 22 may further comprise a cord (not shown) to provide an electrical connection between the charger and an electrical outlet.

Figure 3:
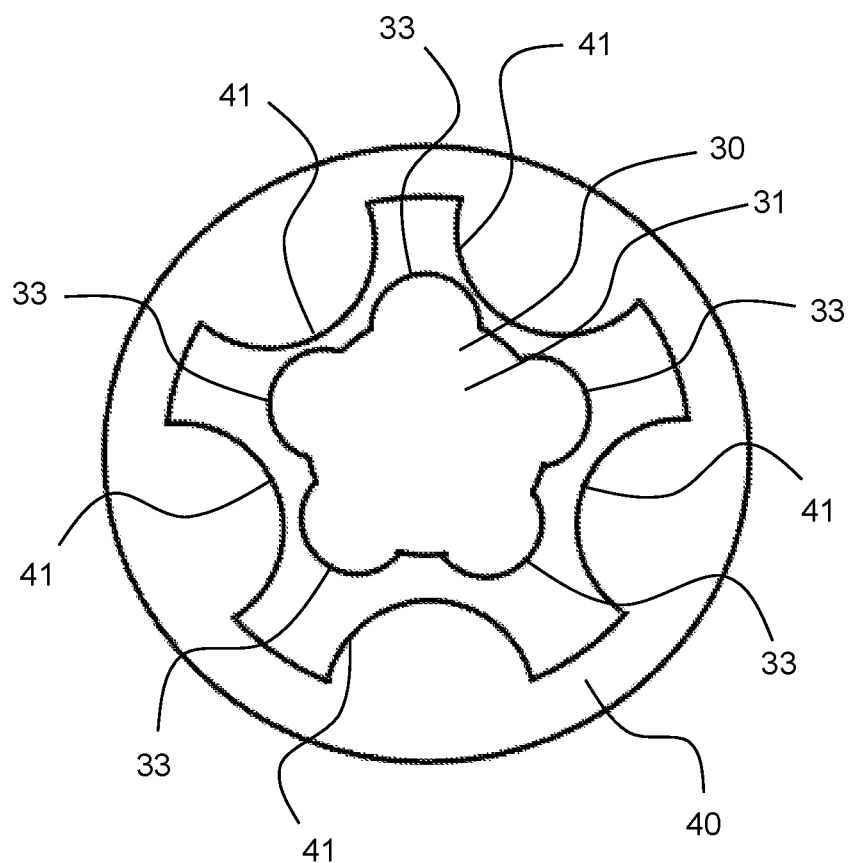
FIG. 3 is a top section view of a bristle head mating with an outer gear.

FIG. 3 shows a top section view of the distal end 31 of the bristle head 30 mating with the rounded gear teeth 41 of the outer gear 40. The outer gear 40 comprises a plurality of rounded gear teeth 41 that interact with rounded gear teeth 33 of the bristle head 30. This interaction is such that when the outer gear 40 rotates in a clockwise direction, the rounded gear teeth 41 of the outer gear 40 interact with the rounded gear teeth 33 of the bristle head 30 to cause the bristle head to rotate in a clockwise direction. The bristle head 30 is sized appropriately so that the previously described interaction between the rounded gear teeth translates the bristle head 30 within the confines of the outer gear 40. This creates a unique bristle pattern shown and described in FIG. 4.

Figure 4:
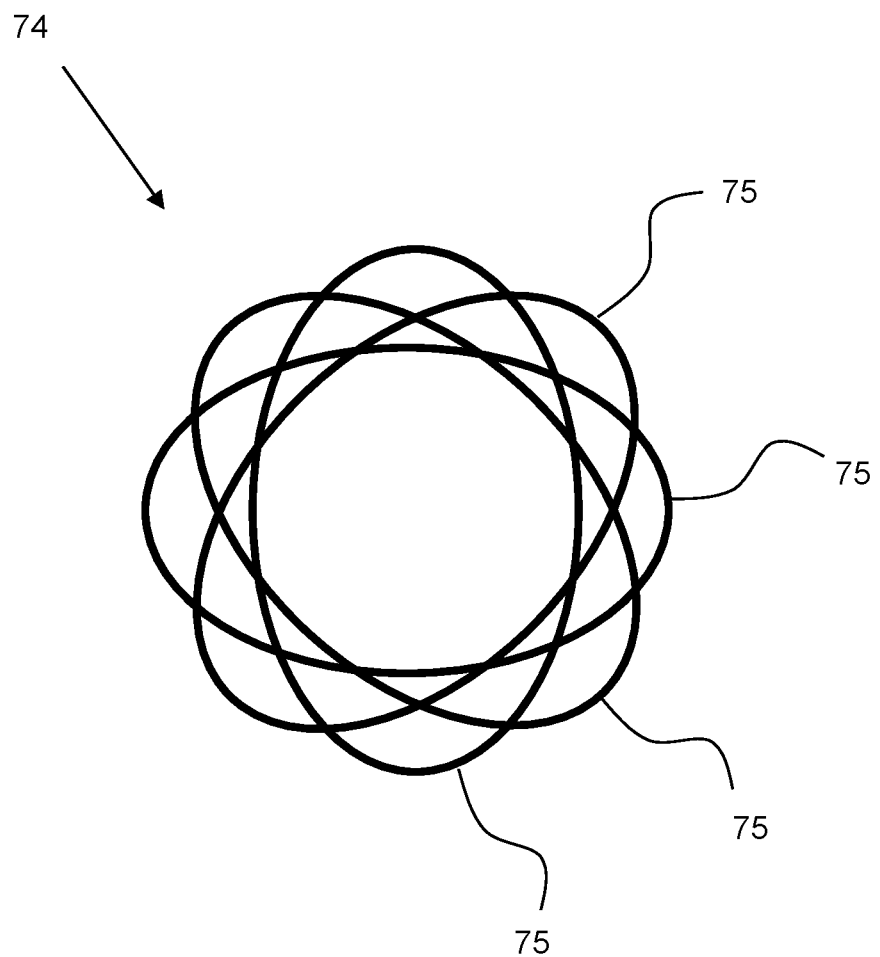
FIG. 4 is a top view of bristle pattern.

FIG. 4 shows a bristle pattern 74 comprising a plurality of radially configured oval-shaped bristle paths 75, wherein the plurality of oval-shaped bristle paths is radially symmetric. The bristle paths 75 shown in FIG. 4 are oval-shaped to show that the bristle head 30 may translate in a series of oval-shaped paths while simultaneously rotating. This motion of simultaneous rotation and translation provides the benefit of enhanced teeth cleaning when the bristles 34 contact a user's teeth.

What is claimed is:

1. A powered toothbrush, comprising:
    a bristle head comprising:
        a distal end comprising a plurality of rounded gear teeth, wherein transitions between the plurality of rounded gear teeth comprise non-rounded corners;
        a proximal end;
        a center;
    an outer gear comprising:
        a distal end comprising a first bevel gear;
        a proximal end comprising a plurality of rounded gear teeth, wherein transitions between the plurality of rounded gear teeth comprise non-rounded corners;
        a center;
    a driveshaft comprising:
        a distal end;
        a proximal end comprising a second bevel gear; and
    a plurality of bristles, each bristle comprising a distal end and a proximal end,
    wherein the distal ends of the plurality of bristles are connected to the proximal end of the bristle head,
    wherein the second bevel gear mates with the first bevel gear, wherein the driveshaft rotates about a third axis of rotation to power a rotation of the outer gear about a first axis of rotation,
    wherein the plurality of rounded gear teeth of the outer gear mate with the plurality of the rounded gear teeth of the bristle head to cause the bristle head to orbit the first axis of rotation via a series of radially configured oval-shaped bristle paths while simultaneously completing one or more rotary movements about a second axis of rotation,
    wherein the second axis of rotation moves along the series of radially configured oval-shaped bristle paths with the bristle head, wherein the series of radially configured oval-shaped bristle paths is radially symmetric.

2. The powered toothbrush of claim 1, wherein the one or more rotary movements comprise at least one full rotation about the second axis of rotation.

3. The powered toothbrush of claim 1, wherein the second axis of rotation is parallel to the first axis of rotation.

4. The powered toothbrush of claim 1, wherein the one or more bristle paths are located on a translation plane, and wherein the translation plane is normal to the first axis of rotation.

5. The powered toothbrush of claim 1, wherein the third axis of rotation is perpendicular to the first axis of rotation.

6. The powered toothbrush of claim 1, wherein the distal end of the bristle head mates with the proximal end of the outer gear such that the center of the bristle head is located an offset distance from the center of the outer gear,
    and wherein at least at one point during the orbit of the first axis of rotation by the bristle head, none of the plurality of rounded gear teeth of the bristle head contact any of the plurality of rounded gear teeth of the outer gear.

\* \* \* \* \*